United States Patent
Moskal et al.

(10) Patent No.: US 10,042,058 B2
(45) Date of Patent: Aug. 7, 2018

(54) DETECTING DEVICE FOR DETERMINING A POSITION OF REACTION OF GAMMA QUANTA AND A METHOD FOR DETERMINING A POSITION OF REACTION OF A GAMMA QUANTA IN POSITRON EMISSION TOMOGRAPHY

(71) Applicant: UNIWERSYTET JAGIELLONSKI, Cracow (PL)

(72) Inventors: Pawel Moskal, Czulowek (PL); Jerzy Smyrski, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 0 days.

(21) Appl. No.: 14/915,262

(22) PCT Filed: Aug. 29, 2014

(86) PCT No.: PCT/EP2014/068375
§ 371 (c)(1),
(2) Date: Feb. 29, 2016

(87) PCT Pub. No.: WO2015/028605
PCT Pub. Date: Mar. 5, 2015

(65) Prior Publication Data
US 2016/0216380 A1    Jul. 28, 2016

(30) Foreign Application Priority Data
Aug. 30, 2013  (PL) .......................................... 405186

(51) Int. Cl.
*G01T 1/16*   (2006.01)
*G01T 1/164*  (2006.01)
*G01T 1/20*   (2006.01)

(52) U.S. Cl.
CPC .......... *G01T 1/1642* (2013.01); *G01T 1/2006* (2013.01)

(58) Field of Classification Search
CPC ............................ G01T 1/1642; G01T 1/2006
USPC ......................................................... 250/362
See application file for complete search history.

(56) References Cited

U.S. PATENT DOCUMENTS

| | | | | |
|---|---|---|---|---|
| 5,103,098 A | * | 4/1992 | Fenyves | G01T 1/201 250/363.03 |
| 6,459,085 B1 | * | 10/2002 | Chang | G01T 1/1642 250/367 |
| 2002/0121604 A1 | * | 9/2002 | Katagiri | G01T 1/1644 250/368 |
| 2009/0159804 A1 | * | 6/2009 | Shibuya | G01T 1/2985 250/363.03 |

* cited by examiner

Primary Examiner — Edwin Gunberg
(74) Attorney, Agent, or Firm — Mark M. Friedman

(57) ABSTRACT

A detector device for determining a position of reaction of gamma quanta, the device comprising: a detection layer comprising: at least one polymeric or inorganic scintillator (12, 22) for absorbing gamma quanta and for emitting and propagating scintillation photons; and photoelectric converters (14,24) for converting light signals of the scintillation photons into electric signals; and at least one additional layer comprising: strips of material (13, 23) for absorbing the scintillation photons and for emitting and propagating secondary photons; and photoelectric converters (15, 25) for converting the light signals for the scintillation photons into electric signals.

8 Claims, 4 Drawing Sheets

DETECTING DEVICE FOR DETERMINING A POSITION OF REACTION OF GAMMA QUANTA AND A METHOD FOR DETERMINING A POSITION OF REACTION OF A GAMMA QUANTA IN POSITRON EMISSION TOMOGRAPHY

TECHNICAL FIELD

The present disclosure relates to a detecting device for determining a position of reaction of gamma quanta and a method for determining a position of reaction of gamma quanta in positron emission tomography.

BACKGROUND

Images of the interiors of bodies may be acquired using various types of tomographic techniques, which involve recording and measuring radiation from tissues and processing acquired data into images.

One of these tomographic techniques is positron emission tomography (PET), which involves determining spatial distribution of a selected substance throughout the body and facilitates detection of changes in the concentration of that substance over time, thus allowing to determine the metabolic rates in tissue cells.

The selected substance is a radiopharmaceutical administered to the examined object (e.g. a patient) before the PET scan. The radiopharmaceutical, also referred to as an isotopic tracer, is a chemical substance having at least one atom replaced by a radioactive isotope, e.g. $^{11}C$, $^{15}O$, $^{13}N$, $^{18}F$, selected so that it undergoes radioactive decay including the emission of a positron (antielectron). The positron is emitted from the atom nucleus and penetrates into the object's tissue, where it is annihilated in reaction with an electron present within the object's body.

The phenomenon of positron and electron annihilation, constituting the principle of PET imaging, consists in converting the masses of both particles into energy emitted as annihilation photons, each having the energy of 511 keV. A single annihilation event usually leads to formation of two photons that diverge in opposite directions at the angle of 180° in accordance with the law of conservation of the momentum within the electron-positron pair's rest frame, with the straight line of photon emission being referred to as the line of response (LOR). The stream of photons generated in the above process is referred to as gamma radiation and each photon is referred to as gamma quantum to highlight the nuclear origin of this radiation. The gamma quanta are capable of penetrating matter, including tissues of living organisms, facilitating their detection at certain distance from object's body. The process of annihilation of the positron-electron pair usually occurs at a distance of several millimeters from the position of the radioactive decay of the isotopic tracer. This distance constitutes a natural limitation of the spatial resolution of PET images to a few millimeters.

A PET scanner comprises detection devices used to detect gamma radiation as well as electronic hardware and software allowing to determine the position of the positron-electron pair annihilation on the basis of the position and time of detection of a particular pair of the gamma quanta. The radiation detectors are usually arranged in layers forming a ring around object's body and are mainly made of an inorganic scintillation material. A gamma quantum enters the scintillator, which absorbs its energy to re-emit it in the form of light (a stream of photons). The mechanism of gamma quantum energy absorption within the scintillator may be of dual nature, occurring either by means of the Compton's effect or by means of the photoelectric phenomenon, with only the photoelectric phenomenon being taken into account in calculations carried out by current PET scanners. Thus, it is assumed that the number of photons generated in the scintillator material is proportional to the energy of gamma quanta deposited within the scintillator.

Inorganic scintillators used in the PET technique, usually 0.5 cm×0.5 cm in cross-section and in the order of 1 cm in length are usually arranged in blocks of the size of several centimeters. Photomultipliers are attached to the back side of each block so as to convert the received light pulses into electrical pulses. Such an assembly allows to determine the position of reaction of the gamma quantum with the accuracy equal to the size of the smaller element. In further analysis, when reconstructing the image, an assumption is made that the gamma quantum was absorbed in the centre of the element. Lack of information on the depth of interaction (DOI) is one of the reasons that limit the resolution of acquired images. The further the distance of the annihilation position from the scanner's axis and the thicker the scintillator blocks, the higher the image deformations; therefore, determination of DOI is particularly important for the improvement of whole body imaging by improving the resolution far from the instrument axis and increasing the gamma quantum capture capabilities by allowing application of thicker scintillators.

Polymeric scintillators with relatively short decay times of ca. 2 ns are also known, being well suitable for measuring the particle detection times. They are commonly used in nuclear physics and elementary particles physics to record energy losses and transition moments of charged particles. Most commonly, scintillators are shaped as strips of rectangular cross-section. Light pulses (scintillations) that accompany interactions of charged particles, such as electrons, or neutral particles, such as gamma quanta, with scintillator material are recorded by a pair of photomultipliers optically connected to the end of each strip.

PET scanners making use of polymeric scintillators for detection of gamma radiation and methods for determination of the positions of reaction of gamma quanta in the applied detection systems are known in literature.

The PCT application WO2011/008119 disclosed a strip scanner based on polymeric strip scintillators read-out at both ends by a pair of photomultipliers. The position of interaction of the gamma quantum in the scintillator material is measured along the length of the strip and calculated on the basis of the differences in times of propagation of light pulses recorded by the pair of photomultipliers. Assuming a very high resolution of 100 ps (value expressed as full width at half maximum [FWHM]), for the light pulse propagation time difference and considering the fact that the light pulse propagation speed is lower than the speed of light in vacuum by about a factor of two, the position resolution of the scintillator used in the solution is at the level of 0.75 cm (FWHM).

In the PCT application WO2011008118, disclosing a matrix tomography scanner, a polymeric scintillator plate was used in the detector system, with light signals being detected along the periphery as well as on one side of scintillator plate by a matrix of photomultipliers. The recorded times of pulse propagations and the amplitudes of the pulses facilitate determination of the position and times of gamma quanta interacting with scintillators.

The aforementioned methods to determine the positions of the reactions of the gamma quanta used in acquisition of positron emission tomography images allow a conclusion that there is a continuous need for the development of new methods allowing for more precise determination of the positions of the gamma quanta reactions as well as of devices allowing for better positional resolution capabilities of polymeric scintillators.

It would be expedient to develop a device allowing for precise determination of the position of the reaction of the gamma quanta in positron emission tomography with simultaneous improvement of imaging via ameliorating positional resolution capabilities of the detector system.

SUMMARY

There is disclosed a detector device for determining a position of reaction of gamma quanta, the device comprising: a detection layer comprising: at least one polymeric or inorganic scintillator for absorbing gamma quanta and for emitting and propagating scintillation photons; and photoelectric converters for converting light signals of the scintillation photons into electric signals; and at least one additional layer comprising: strips of material for absorbing the scintillation photons and for emitting and propagating secondary photons; and photoelectric converters for converting the light signals for the scintillation photons into electric signals.

Preferably, the scintillator strips are arranged next to each other along their longest edges to form a detection layer.

Preferably, the strips of material for absorbing and for emitting and propagating the scintillation photons are arranged next to each other along their longest edges to form a detection layer.

Preferably, the scintillator detection layer is a scintillator plate.

Preferably, the detector assembly comprises an inner detection layer of a scintillator plate as well as the upper and lower layer of strips of material for absorbing the scintillation photons and for emitting and propagating secondary photons, wherein the strips of material of the upper and lower layer are arranged at an angle, preferably at a right angle, to their longest edges in the plane of the polymeric scintillator plate.

Preferably, the photomultipliers are silicon photomultipliers.

Preferably, the photomultipliers are photomultiplier tubes.

Preferably, the device constitutes a gamma radiation detection layer in a positron emission tomography (TOF-PET) scanner.

Preferably, the device constitutes a gamma radiation detection layer in a hybrid positron emission tomography and magnetic resonance (TOF-PET/MR) scanner.

Preferably, the device constitutes a gamma radiation detection layer in a hybrid positron emission tomography and computed tomography (TOF-PET/CT) scanner.

There is also disclosed a method for determining a position of reaction of gamma quanta using a device comprising: a detection layer comprising: at least one polymeric or inorganic scintillator for absorbing gamma quanta and for emitting and propagating scintillation photons; and photoelectric converters for converting light signals of the scintillation photons into electric signals; and at least one additional layer comprising: strips of material for absorbing the scintillation photons and for emitting and propagating secondary photons; and photoelectric converters for converting the light signals for the scintillation photons into electric signals; wherein the method comprises determining position of reaction of a gamma quantum along the longitudinal axis of the scintillator on the basis of a weighted average of positions at the material strip, wherein the weights are the amplitudes of signals recorded in material strips, being proportional to the number of photons recorded in a particular strip.

Preferably, the depth of interaction (DOI) of gamma quanta is determined from the number of strips of material for scintillation photon absorption as well as secondary photon emission and propagation in which scintillation photons formed by reaction of a single gamma quantum were recorded.

BRIEF DESCRIPTION OF FIGURES

Example embodiments are presented on a drawing wherein.

DETAILED DESCRIPTION

In the presented method, gamma radiation can be recorded by polymeric scintillator strips and matrices used in positron emission tomography and disclosed in PCT applications WO2011/008119 and WO2011008118.

Figure 1:
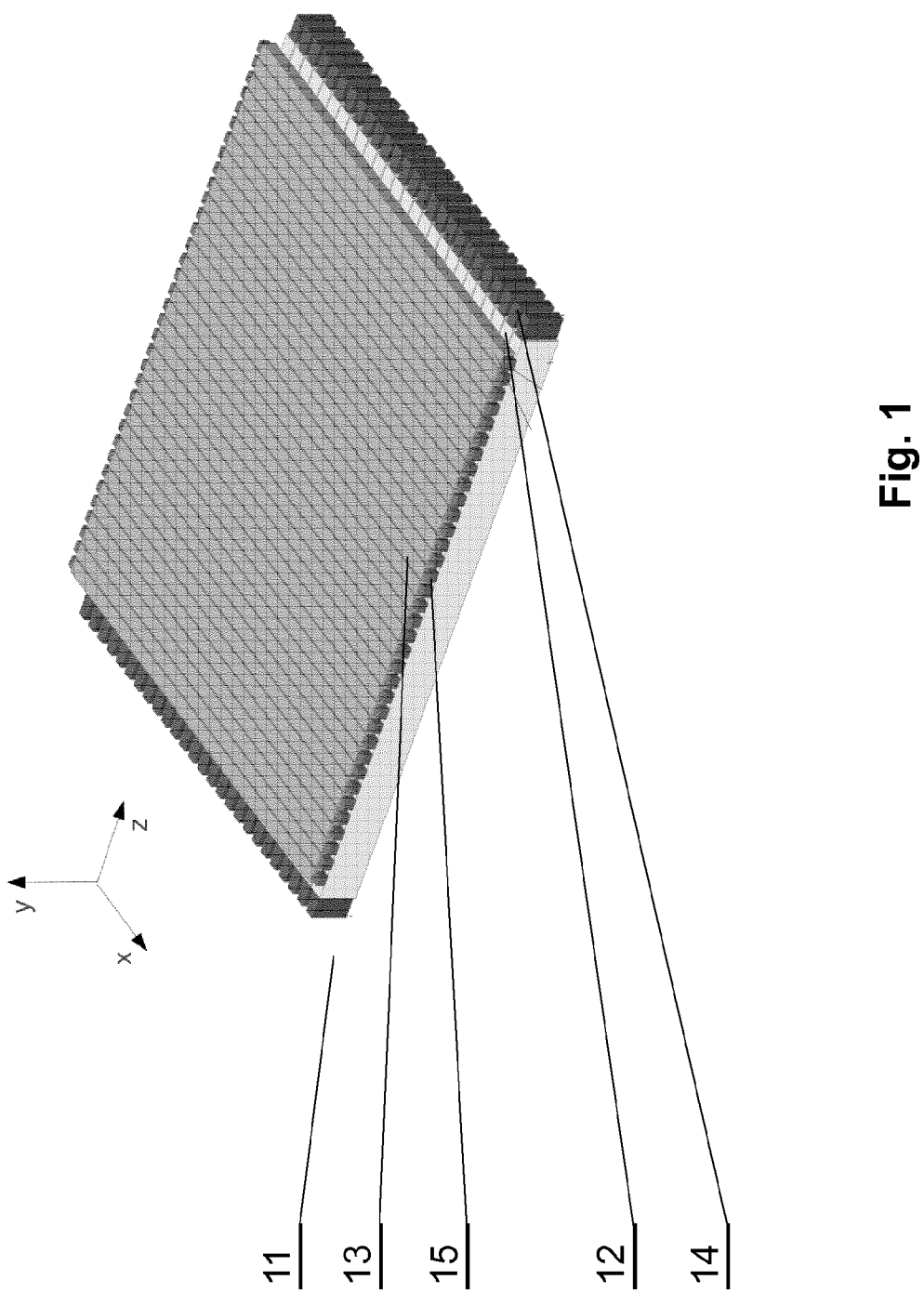
FIG. 1 presents an outline of a segment with polymeric scintillator strips.

FIG. 1 presents an outline of a detector segment 11 used to record gamma radiation in the first embodiment. Segment 11 may comprise two layers, the first layer being a gamma radiation detection layer comprising polymeric scintillator strips 12 arranged in one plane, parallel to one another along their longest edges, and photomultipliers 14. The second layer may comprise strips made of wave length shifter (WLS) material that permit absorption of photons of a particular wavelength and propagation of secondary photons, said strips being optically connected to an assembly of photomultipliers 15, wherein each WLS strip 13 can be connected to a pair of photomultipliers 15. The material of WLS strips 13 is preferably selected so as it absorbs scintillation photons, i.e. photons of wavelengths emitted from scintillator strips 12. The WLS strips 13 may be arranged in one plane, parallel to one another along their longest edges to form the second layer. The layer of WLS strips 13 and the layer of scintillator strips 12 may be arranged in parallel, one above the other, with longest edges of WLS 13 strips being oriented perpendicular to the longest edges of scintillator strips 12 in the (x-z) plane in relation to the (x, y, z) system of coordinates as presented in FIG. 1.

Figure 2:
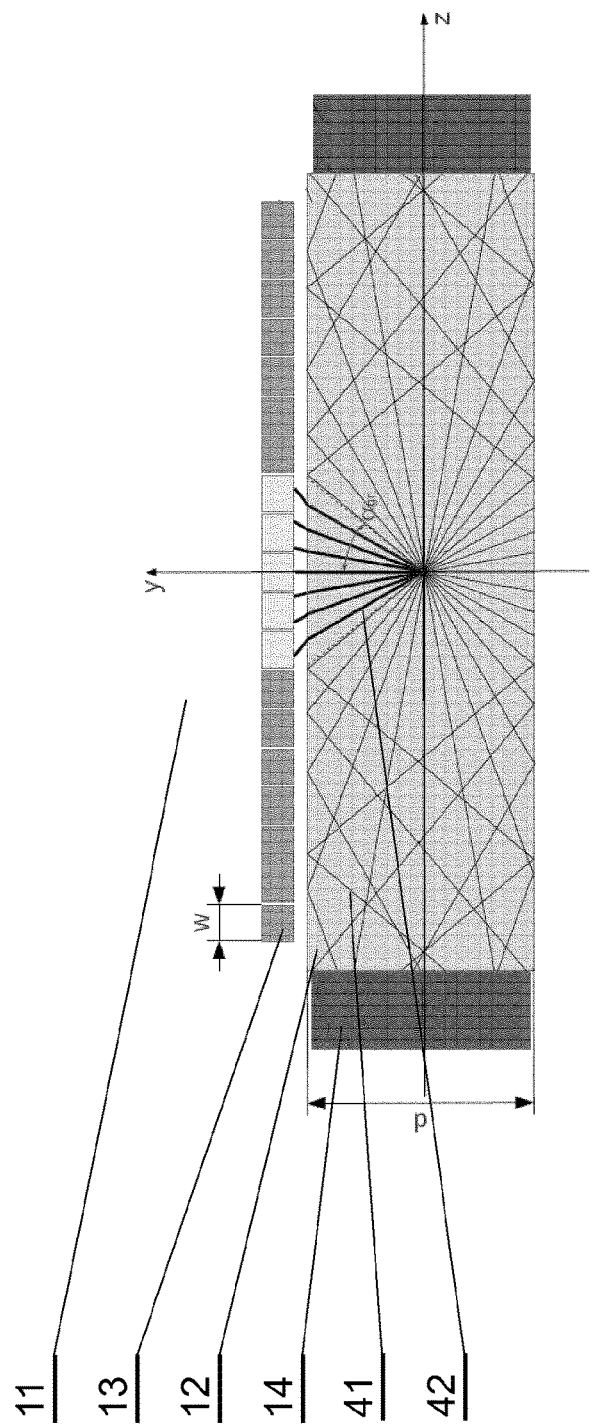
FIG. 2 presents an outline of a polymeric scintillator strip in longitudinal cross-section wherein two ends of the strip are optically connected to a photomultiplier.

FIG. 2 illustrates the concept of the measurement of the position of reaction of the gamma quantum using a detector system, including a schematically outlined detector segment 11 in a longitudinal cross-section through the scintillator strip 12, where "d" is the thickness of scintillator strip 12 and "w" is the width of the WLS strip 13. For better understanding, the y-z system of coordinates was introduced wherein the origin of said system of coordinates corresponds to the geometric centre of scintillator strip 12, defined as y=z=0.

The scintillator segment 11 is placed within the range of gamma radiation. The energy carried along with gamma radiation is absorbed by the material of the scintillator strip 12 and emitted as scintillation photons.

The trajectories of scintillation photons emitted at the geometric centre of the scintillator strip within the (y-z) plane at an angle equal to a multiplicity of 10° against the y axis are marked by the thin solid line 41 and the bold line 42. Scintillation photons emitted within the (y-z) plane at the origin of the selected system of coordinates at angles larger than the critical angle (marked as $\alpha_{gr}$ in FIG. 2) are subject to total internal reflection from scintillator walls and are propagated towards photomultipliers 14, as illustrated by the thin solid line 41. In a preferred embodiment, a scintillation material with critical angle of about 39.2°, corresponding to refraction coefficient of n=1.58 was applied. Scintillation photons emitted within the (y-z) plane at angles lower than the critical angle against the y axis may leave the scintillator and become absorbed by the material of the WLS strip 13—trajectories of photons absorbed by WLS strips 13 are marked by the bold line 42. The material of WLS strips 13 is selected so as it effectively absorbs photons of wavelengths emitted by scintillators. As a result of absorption of the scintillation photons, WLS strips 13 may emit photons of a different wavelength, referred to as secondary photons which, similarly to scintillation photons from scintillation strips 12, are propagated towards photomultipliers 15 of WLS strips 13 as a result of internal reflections.

In the presented method, the (y, z) coordinates of the reactions of the gamma quanta are determined in the following fashion:

The position of gamma quanta along the z axis is determined from the weighted average position of the WLS strips 13, with weights being the amplitudes of signals recorded in the strips, proportional to the number of photons recorded in particular strip. This may be expressed by the following formula:

$$Z = \text{sigma\_over\_}i(z\_i * A\_i)/\text{sigma\_over\_}i(A\_i)$$

where:
A_i—the amplitude of the signal recorded in the i_th WLS strip;
z_i—the z coordinate of the centre of the i_th WLS strip.
A_i may be calculated as geometric or arithmetic mean of amplitudes of signals measured at both ends of the WLS strip: A_i=(A_left_i+A_right_i)/2 or (A_i=sqrt(A_left_i*A_right_i).

The position of gamma quanta along the y axis (depth of interaction—DOI) is determined based on number of the WLS strips 13 that record the scintillation photons, the critical angle value of the scintillator material and the refraction coefficient.

For instance, for polymeric scintillator with the critical angle of about 39.2° corresponding to the refraction coefficient of n=1.58, the position of reaction of the gamma quantum is located near the surface close to the WLS strips 13: y=d/2, where d is the thickness of scintillator 12 when the signal is recorded in one strip.

If scintillation photons have been recorded by five WLS strips, wherein the dimension of the scintillator is, for example: d=30 mm and the dimension of the WLS strip is, for example: w=5 mm, the position of annihilation of the gamma quantum, is located within the scintillator centre: y=0.

If scintillation photons have been recorded by ten WLS strips, then for the same dimensions of the scintillator and WLS strips (d=30 mm, w=5 mm), the position of annihilation of the gamma quantum will be located near the opposite surface of the scintillator: y=−d/2.

In general, the depth of interactions may be determined from the number of WLS strips and the relationship between the number of WLS strips and depth may be determined experimentally for each system.

Figure 3:
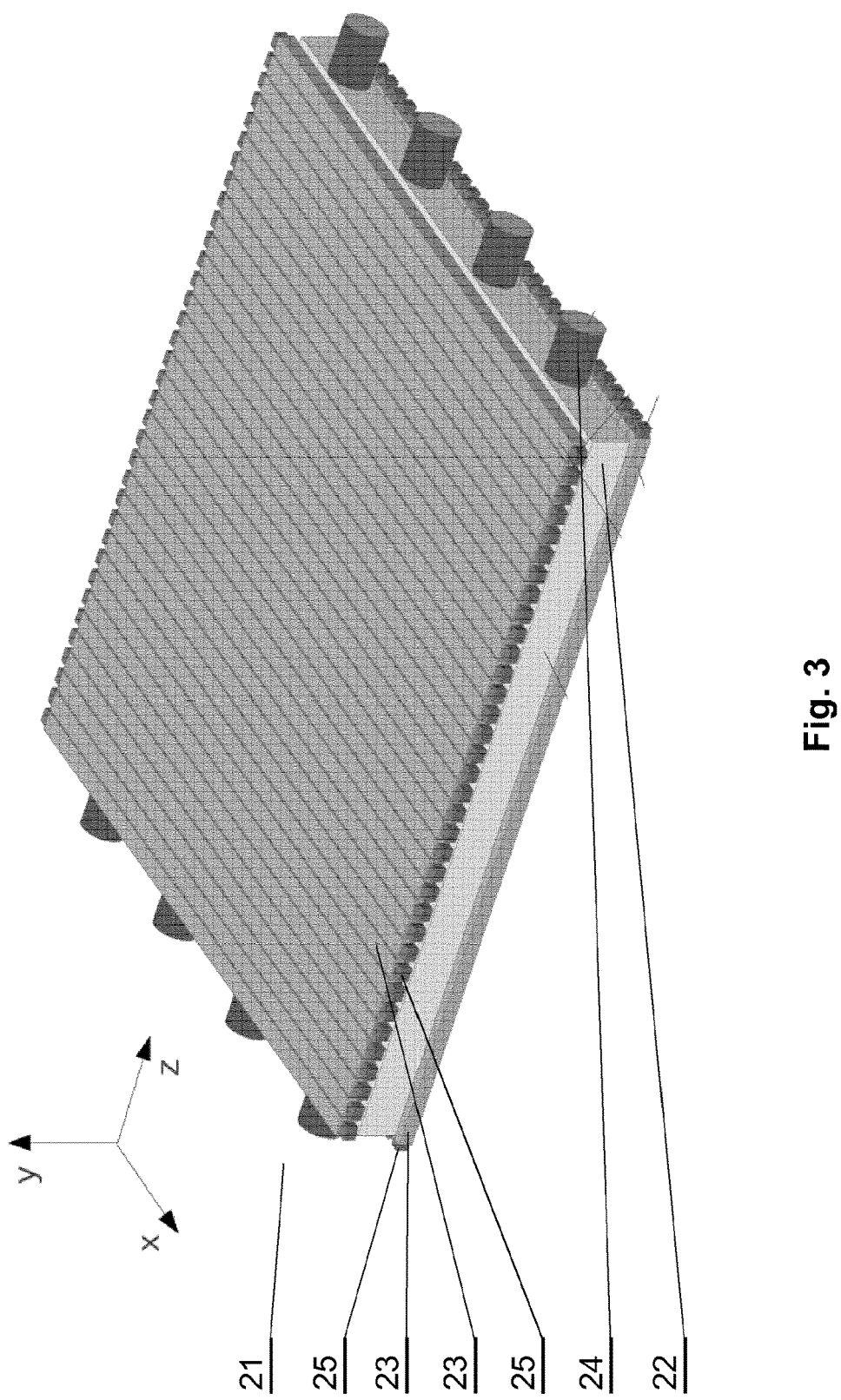
FIG. 3 presents an outline of a segment with polymeric scintillator plate.

FIG. 3 presents an outline of a scintillator segment 21 in a second embodiment. Segment 21 may comprise a detection layer with a scintillator plate 22 optically connected to an assembly of photomultipliers 24. The segment may comprise two layers of WLS strips 23, wherein each WLS strip 23 may be optically connected to a pair of photomultipliers arranged parallel to the scintillator plate 22 on both sides of the plate, wherein the WLS strips 23 in the upper layer may be oriented perpendicular to the WLS strips in the lower layer within the (x-z) plane of the system of coordinates presented in FIG. 3.

The material of WLS strips 23 may be selected so as the gamma radiation can pass through it, while the positions of reactions of the gamma quanta with the scintillator plate 22 material may be recorded using the assembly of photomultipliers 24.

The energy of the gamma quanta deposited in the material of scintillator 22 is emitted as scintillation photons which, in a mechanism analogous to that presented in FIG. 2, are recorded by a system consisting of two WLS strip assemblies arranged perpendicular to each other. The (x,y,z) coordinates of the positions of reactions of the gamma quanta within segment 21 are determined in a manner analogous to that for segment 11.

In addition, the scintillator segment may include a detection layer featuring a scintillator plate 22 and one layer of WLS strips 23. In such case, the presented method may be used to determine two coordinates of the positions of reactions of the gamma quanta, for example the depth of interaction DOI (y coordinate) and the z coordinate.

Segments 11, 21 as presented herein may be used for example in positron emission tomography scanners for detecting gamma radiation. Segments according to the first and the second embodiments may replace the gamma radiation detection layer in known strip or plate PET scanners. Segments 11, 21 may also be used as gamma radiation detectors in hybrid tomography scanners used for PET imaging combined with imaging using other known techniques such as nuclear magnetic resonance or computed tomography.

Figure 4:
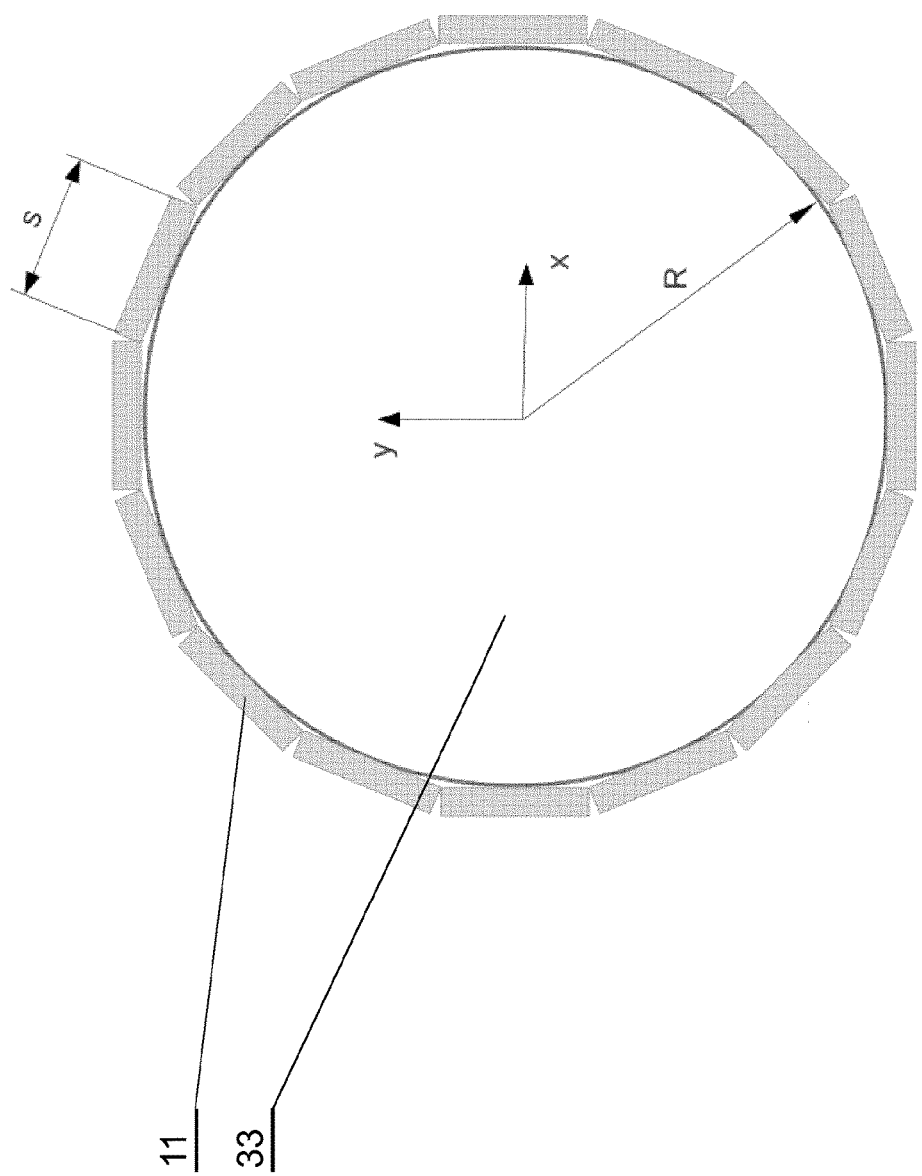
FIG. 4 presents an outline of segments with polymeric scintillators in positron emission tomography scanner.

FIG. 4 presents the transverse cross-section of the layout of scintillator segments 11 according to the first embodiment within a PET scanner. In FIG. 4, the axis of the PET scanner is perpendicular to the (x-y) plane determined by the selected system of coordinates.

Polymeric scintillators may be arranged in segments with separate WLS strip assemblies. For example, polymeric scintillators may be divided into sixteen segments, each of the width s=160 mm, forming a PET scanner scintillation chamber tunnel 41 with the radius R=402 mm into which an examined object is introduced following application of a radiopharmaceutical so as to acquire a PET scan image.

Detector systems with WLS strip assemblies offer far better positional resolution capabilities at the level of 0.5 cm (FWHM) while simultaneously allowing for much more precise determination of the positions of reactions of the gamma quanta, including depth of interaction (DOI), thus permitting three-dimensional reconstruction of the interactions of gamma quanta with the scintillator and acquisition of more precise images, for instance PET scan images.

In addition, introduction of WLS strips into the PET detector systems allowed for additional recording of scintillation photons emitted at angles lower than the critical angle of a particular scintillator material.

While the technical solutions presented herein have been depicted, described, and defined with reference to particular preferred embodiment(s), such references and examples of implementation in the foregoing specification do not imply any limitation on the invention. Various modifications and changes may be made thereto without departing from the scope of the technical solutions presented. The presented embodiments are given as example only, and are not exhaustive of the scope of the technical solutions presented herein. Accordingly, the scope of protection is not limited to the preferred embodiments described in the specification, but is only limited by the claims that follow.

The invention claimed is:

1. A detector device for determining a position of reaction of gamma quanta, the detector device comprising:
   a detection layer comprising:
      at least one polymeric or inorganic scintillator having a form of a plate with plane outer surfaces for absorbing gamma quanta and for emitting and propagating scintillation photons; and
      photoelectric converters for converting light signals of the scintillation photons into electric signals; and
   a first additional layer and a second additional layer, each comprising:
      a series of strips of material arranged next to each other along their longest edges for absorbing the scintillation photons emitted by the at least one scintillator of the detection layer and for emitting and propagating secondary photons, wherein the strips have a rectangular cross-section; and
      silicon photomultipliers at both ends of each of the strips for converting light signals of the secondary photons into electric signals;
   wherein the first additional layer is arranged at a first side of the detection layer and distanced from the detection layer by a first gap and the second additional layer is arranged at a second side, opposite to the first side, of the detection layer and distanced from the detection layer by a second gap;
   and wherein longest edges of the strips of the first additional layer are arranged at a non-zero angle to longest edges of the strips of the second layer in the plane of the polymeric scintillator plate.

2. The device according to claim 1 comprising at least two scintillators arranged next to each other in the detection layer.

3. The device according to claim 1 wherein the photoelectric converters are photomultiplier tubes.

4. The device according to claim 1 wherein the device constitutes a gamma radiation detection layer in a Time-of-Flight Positron Emission Tomography (TOF-PET) scanner.

5. The device according to claim 1 wherein the device constitutes a gamma radiation detection layer in a hybrid Time-of-Flight Positron Emission Tomography and Magnetic Resonance (TOF-PET/MR) scanner.

6. The device according to claim 1 wherein the device constitutes a gamma radiation detection layer in a hybrid Time-of-Flight Positron Emission Tomography and Computed Tomography (TOF-PET/CT) scanner.

7. A method for determining a position of reaction of gamma quanta using a device comprising:
   a detection layer comprising:
      at least one polymeric or inorganic scintillator having a form of a plate with plane outer surfaces for absorbing gamma quanta and for emitting and propagating scintillation photons; and
      photoelectric converters for converting light signals of the scintillation photons into electric signals; and
   a first additional layer and a second additional layer, each comprising:
      a series of strips of material arranged next to each other along their longest edges for absorbing the scintillation photons emitted by the at least one scintillator of the detection layer and for emitting and propagating secondary photons, wherein the strips have a rectangular cross-section; and
      silicon photomultipliers at both ends of each of the strips for converting light signals of the secondary photons into electric signals;
   wherein the first additional layer is arranged at a first side of the detection layer and distanced from the detection layer by a first gap and the second additional layer is arranged at a second side, opposite to the first side, of the detection layer and distanced from the detection layer by a second gap;
   and wherein longest edges of the strips of the first additional layer are arranged at a non-zero angle to longest edges of the strips of the second layer in the plane of the polymeric scintillator plate
wherein the method comprises determining a position of reaction of a gamma quantum along the longitudinal axis of the scintillator on the basis of a weighted average of positions at the strip of the first additional layer and the second additional layer, wherein weights of the weighted average are amplitudes of signals recorded in the strip, being proportional to the number of the secondary photons recorded in the strip.

8. The method according to claim 7 wherein the depth of interaction (DOI) of gamma quanta is determined from the number of strips of the first additional layer and the second additional layer for scintillation photon absorption as well as secondary photon emission and propagation in which scintillation photons formed by reaction of a single gamma quantum were recorded.

* * * * *